United States Patent
Iwase

(10) Patent No.: US 7,460,327 B2
(45) Date of Patent: Dec. 2, 2008

(54) MAGNETIC DISK APPARATUS

(75) Inventor: Takeshi Iwase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 11/450,281

(22) Filed: Jun. 12, 2006

(65) Prior Publication Data

US 2007/0206313 A1    Sep. 6, 2007

(30) Foreign Application Priority Data

Mar. 1, 2006    (JP)    ............... 2006-054618

(51) Int. Cl.
*G11B 21/02*    (2006.01)
(52) U.S. Cl. ........................................... 360/75
(58) Field of Classification Search ............... 360/75, 360/97.02, 69, 66, 31, 46; 714/704; 148/121
See application file for complete search history.

(56) References Cited

U.S. PATENT DOCUMENTS

| | | | | |
|---|---|---|---|---|
| 5,991,113 | A  * | 11/1999 | Meyer et al. ........... | 360/75 |
| 6,064,534 | A  * | 5/2000 | Simozato ............... | 360/46 |
| 6,961,199 | B2 * | 11/2005 | Onda et al. ............. | 360/69 |
| 7,046,473 | B2 * | 5/2006 | Fu et al. ................. | 360/75 |
| 7,117,399 | B2 * | 10/2006 | Song ..................... | 714/704 |
| 7,173,786 | B2 * | 2/2007 | Antoku et al. .......... | 360/66 |
| 7,239,471 | B2 * | 7/2007 | Tanabe .................. | 360/75 |
| 2005/0056346 | A1 * | 3/2005 | Yamamoto ............ | 148/121 |
| 2006/0103960 | A1 * | 5/2006 | Imamura et al. ....... | 360/31 |
| 2006/0119974 | A1 * | 6/2006 | Yamazaki et al. ..... | 360/75 |
| 2006/0221487 | A1 * | 10/2006 | Hidaka .................. | 360/75 |

FOREIGN PATENT DOCUMENTS

JP    2003-297029    10/2003

* cited by examiner

*Primary Examiner*—Fred Tzeng
(74) *Attorney, Agent, or Firm*—Kratz, Quintos & Hanson, LLP.

(57) ABSTRACT

Magnetic disk apparatus includes a magnetic head element having a read element and a write element, a heater provided in the magnetic head element for controlling a protruding amount thereof, a write resistance detector that detects a resistance value of the write element, and an MPU (write element temperature calculation unit) that calculates a temperature of the write element as a temperature of the magnetic head element based on a resistance value of the write element detected by the write resistance detector and a temperature coefficient of the write element.

7 Claims, 9 Drawing Sheets

FIG.3

| WRITE ELEMENT TEMPERATURE | CONTROL METHOD /185 | | |
|---|---|---|---|
| | HEATER POWER CONTROL | SENSE CURRENT CONTROL | WRITE CURRENT CONTROL |
| $T_W < 100°C$ | — | 3.6mA | 35mA |
| $100°C \leq T_W < 120°C$ | 5mW Down | 3.2mA | 30mA |
| $120°C \leq T_W < 140°C$ | 5mW Down | 2.8mA | 25mA |
| $140°C \leq T_W$ | 5mW Down | 2.4mA | 20mA |

MAGNETIC DISK APPARATUS

CROSS-REFERENCE TO RELATED APPLICATIONS

This application claims the conventional priority based on Japanese patent application serial No. 2006-054618, filed on Mar. 1, 2006, the disclosures of which are incorporated herein by reference.

BACKGROUND OF THE INVENTION

1. Field of the Invention

The present invention generally relates to a magnetic disk apparatus, and more particularly to a magnetic disk apparatus which controls a protruding amount of a magnetic head element having a read element and a write element by means of a heater provided in the magnetic head element.

2. Description of the Related Art

In a magnetic disk apparatus, it is necessary to control the distance (magnetic spacing) between the magnetic head element and a magnetic disk. A magnetic disk apparatus that controls the magnetic spacing by using the heat of a heater is known (see Japanese Patent Laid-Open No. 2003-297029).

This magnetic spacing control is generally carried out in the following manner. That is, a heater is provided in the magnetic head element or the vicinity thereof. The heater generates heat by the supply of power thereto. As a result of this heat, the magnetic head element undergoes thermal expansion to protrude in the direction of a magnetic disk that is disposed facing the magnetic head element. At this time, depending on the shape of the magnetic head element, the surface facing the magnetic disk appears as though it is protruding as the result of the entire magnetic head element being deformed (see Japanese Patent Laid-Open No. 2003-297029), or the surface facing the magnetic disk simply appears to have protruded. The amount of protrusion of the magnetic head element in the direction of the magnetic disk (hereunder, referred to as "protruding amount") is controlled by the amount of power supplied to the heater, and thus the magnetic spacing is controlled.

When power is supplied to the heater to control the protruding amount, the heater generates heats to increase the temperature of the magnetic head element (and the region in the vicinity thereof). This is a fundamental operation in a magnetic disk apparatus equipped with this kind of magnetic head element having a heater for controlling a protruding amount (hereunder, referred to simply as "magnetic head element with a heater"), and can not be avoided.

However, increasing the temperature of the magnetic head element causes a decrease in the reliability of the magnetic head element. For example, with respect to the write element of the magnetic head element, when processing to write data onto a magnetic disk is continuously performed in a high temperature state it causes a failure such as migration or a disconnection in the write coil. With respect to the read element of the magnetic head element, the passage of a sense current over a long period in a high temperature environment leads to the occurrence of migrations in the read element or noise or the like is produced due to instability in the read element in a high temperature state. It is therefore necessary to use the magnetic head element in a temperature region that does not damage the reliability of the magnetic head element.

SUMMARY OF THE INVENTION

It is an object of the present invention to provide a magnetic disk apparatus including a magnetic head element having a heater for controlling a protruding amount of the magnetic head element, wherein the magnetic disk apparatus calculates the temperature of a write element and controls the power of the heater based on the calculated write element temperature.

The magnetic disk apparatus according to the present invention comprises a magnetic head element including a read element and a write element, a heater provided in the magnetic head element and controlling a protruding amount of the magnetic head element, a resistance detection unit detecting a resistance value of the write element, and a write element temperature calculation unit calculating a temperature of the write element as a temperature of the magnetic head element based on the resistance value of the write element detected by the resistance detection unit and a temperature coefficient of the write element.

Preferably, the magnetic disk apparatus of the present invention further comprises a heater power control unit controlling a heater power supplied to the heater based on the temperature of the write element calculated by the write element temperature calculation unit.

Preferably, the magnetic disk apparatus of the present invention further comprises a sense current control unit controlling a sense current supplied to the read element based on the temperature of the write element calculated by the write element temperature calculation unit.

Preferably, the magnetic disk apparatus of the present invention further comprises a write current control unit controlling a write current supplied to the write element based on the temperature of the write element calculated by the write element temperature calculation unit.

Preferably, the magnetic disk apparatus of the present invention further comprises a control unit performing control of the heater power, control of the sense current, or control of the write current based on the temperature of the write element calculated by the write element temperature calculation unit and a preset control selection information that indicates which control to be performed among control of a heater power to be supplied to the heater, control of a sense current to be supplied to the read element and control of a write current to be supplied to the write element.

The magnetic disk apparatus according to the present invention calculates the temperature of a write element as the temperature of a magnetic head element based on a detected resistance value of the write element and a write element temperature coefficient, with respect to the magnetic head element having a heater controlling a protruding amount. More specifically, the write element is used as a temperature sensor of the magnetic head element. The reason for using the write element and the reason for not using the read element are described later. Thus, it is possible to calculate the temperature of the write element, and consequently the temperature of the magnetic head element in a magnetic disk apparatus having a magnetic head element with a heater without, in particular, providing a temperature sensor.

Further, the magnetic disk apparatus according to the present invention controls a heater power to be supplied to a heater based on the calculated temperature of the write element. It is therefore possible to control a temperature increase in the (write element and read element of the) magnetic head element.

Further, the magnetic disk apparatus according to the present invention controls a sense current to be supplied to the read element based on the calculated temperature of the write element. It is therefore possible to avoid supplying a high-value sense current to the read element for a long period under a high-temperature environment, and to prevent migration or the like in the read element as well as the occurrence of noise due to instability of the read element in a high temperature state.

The magnetic disk apparatus according to the present invention also controls a write current to be supplied to the write element based on the calculated temperature of the write element. It is therefore possible to avoid performing a write operation with a high-value write current in a high-temperature state and also prevent migration, a disconnection or the like in a write coil of the write element.

Further, the magnetic disk apparatus according to the present invention carries out a predetermined control based on the calculated temperature of the write element and preset control selection information. It is therefore possible to selectively carry out any of control of the heater power, control of the sense current or control of the write current depending on the control selection information according to the characteristics of the magnetic disk apparatus.

BRIEF DESCRIPTION OF THE DRAWINGS

FIG. 3 is a diagram showing an example of an electric power/current control table.

DETAILED DESCRIPTION OF THE PREFERRED EMBODIMENTS

Figure 1:
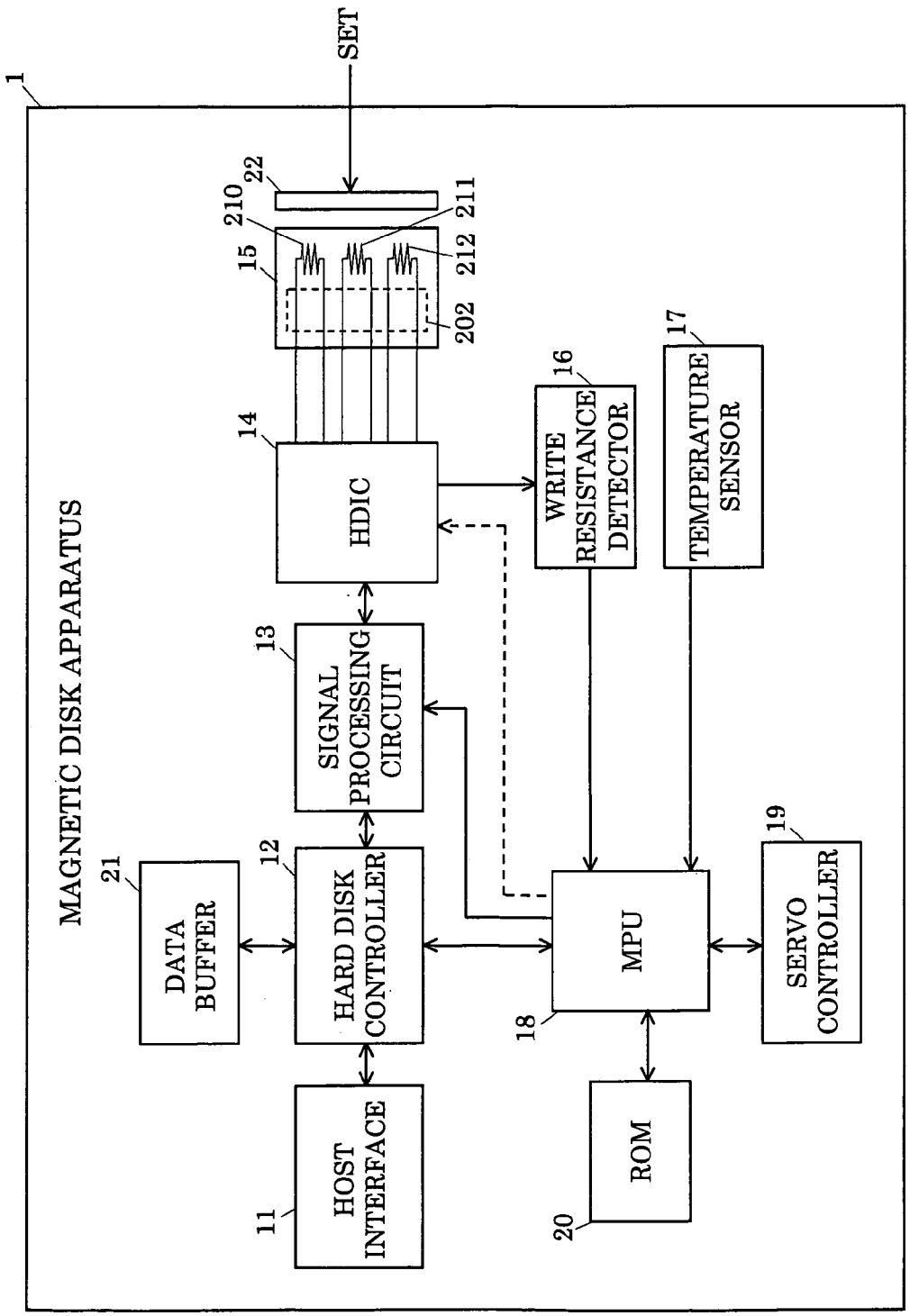
FIG. 1 is a diagram showing an example of a structure of a magnetic disk apparatus.

FIG. 1 is a block diagram of a magnetic disk apparatus which shows an example of a structure of a magnetic disk apparatus according to the present invention.

A magnetic disk apparatus 1 includes a host interface 11 for conducting communication between the magnetic disk apparatus 1 and a host computer (not shown), a hard disk controller (hereunder, referred to simply as "controller") 12 that controls the entire magnetic disk apparatus 1, a signal processing circuit 13 that performs signal processing for encoding and decoding and the like, a head IC (HDIC) 14 that drives a magnetic head element 15, a magnetic head element 15 that carries out operations to write and read data to and from a magnetic disk 22, a write resistance detector 16, a temperature sensor 17, an MPU (Micro Processing Unit) 18, a servo controller 19, a ROM (Read Only Memory) 20 and a data buffer 21.

The magnetic head element (hereunder, also referred to as "magnetic head") 15 includes a read element 210, a write element 211, a heater 212, and a magnetic head circuit 202 that connects these components with the HDIC 14. The magnetic disk 22 is set in the magnetic disk apparatus 1, from outside the magnetic disk apparatus 1, so as to face the magnetic head element 15. Thereby, the read element 210 and the write element 211 face the magnetic disk 22.

The magnetic disk apparatus 1 of the present invention uses the write element 211 as a temperature sensor for detecting for the temperature of the magnetic head element 15. More specifically, the temperature of the write element 211 is calculated as the temperature of the magnetic head element 15 utilizing the temperature dependence of the electrical resistance (described later with reference to FIG. 7) of a write coil comprising the write element 211. The temperature of the write element 211 may, in substance, be considered to be the temperature of the magnetic head element 15 (or an approximate value thereof). Temperature increases in the magnetic head element 15 can be suppressed by a process that controls the power of the heater 212 in response to a calculated temperature of the write element 211, as described later.

In general, there are large variations in the temperature dependence of the electrical resistance of the read element 210 of the magnetic head element 15. Consequently, it can be considered that it is not practically possible to accurately determine the temperature of the read element 210 from the resistance value thereof. Therefore, in the present invention, the temperature of the write element 211 is calculated, and not the temperature of the read element 210. More specifically, the write element 211 is used as a temperature sensor, and not the read element 210.

In a data writing process, the host interface 11 receives the data to be written (hereunder, referred to as "write data") to the magnetic disk 22 from a host computer and sends the data to the controller 12. The controller 12 temporarily stores the write data in the data buffer 21, and then sends the write data to the signal processing circuit 13 at a predetermined timing. The signal processing circuit 13 performs a predetermined signal processing (for example, encoding processing) on the write data to generate a write signal (digital signal), and sends the write signal to the HDIC 14. The HDIC 14 converts the write signal (digital signal) into a write signal (analog signal) for the actual writing, and supplies this signal to the write element 211 of the magnetic head element 15. Thereby, data corresponding to the write signal is written on the magnetic disk 22. At this time, the magnetic disk 22 is rotated in a predetermined direction at a predetermined speed by a motor (not shown) driven by the servo controller 19 (the same applies for the read process described hereunder).

In this connection, since the details of the data writing process are unrelated to control of the temperature of the magnetic head element 15 according to the present invention, a detailed description thereof is omitted herein (the same applies for the read process described hereunder).

In a data reading process, the read element 210 of the magnetic head element 15 reads out a signal (regenerative signal) from the magnetic disk 22 and supplies the signal to the HDIC 14. The HDIC 14 amplifies the read signal (analog signal) that was actually read out and sends it to the signal processing circuit 13. The signal processing circuit 13 performs analog-to-digital conversion and a predetermined signal processing (for example, decoding processing) for the read signal (analog signal) to thereby generate read data (data that was read from the magnetic disk 22), and sends this data to the controller 12. The controller 12 temporarily stores the read data that it received from the signal processing circuit 13 in the data buffer 21, and then sends the data to the host interface 11 at a predetermined timing. The host interface 11 sends the received read data to the host computer.

In this kind of write process, the HDIC 14 supplies a write current to the write element 211 according to an instruction from the MPU 18. The write current is a current supplied to the write element 211 when a process to write the write data on the magnetic disk 22 is performed. More specifically, the HDIC 14 generates a magnetic field in the write element 211 by supplying a write current to the write element 211, to thereby write the write data on the magnetic disk 22.

For a read process, the HDIC 14 supplies a sense current to the read element 210 according to an instruction from the MPU 18. In this case, for example, an MR element is used as the read element 210. The sense current is a current that is supplied to the read element 210 when a process to read the read data from the magnetic disk 22 is performed. More specifically, the HDIC 14 converts the size of a magnetic field detected by the read element 210 into a voltage signal by supplying a sense current to the read element 210, and outputs the converted voltage signal as a regenerative signal.

Further, for a write process and a read process the HDIC 14 heats the heater 212 by supplying a predetermined heater power (power supplied to or that should be supplied to the heater 212) thereto according to an instruction from the MPU 18. The heater 212 generates heat according to the amount of heater power that is supplied from the HDIC 14. Thus, the magnetic spacing between the write element 211 and read element 210 of the magnetic head 15 and the magnetic disk 22 is controlled, as shown in FIG. 6 to be described later.

As described later, the MPU 18 calculates a temperature $T_w$ of the write element 211 and sends a control signal that was generated based on the temperature $T_w$ to the HDIC 14 through the signal processing circuit 13. Thereby, control (namely, control processing; the same applies hereunder) for the heater power as the power supplied to the heater 212, control for the sense current that is supplied to the read element 210, and control for the write current that is supplied to the write element 211 are performed. For this purpose, as shown in FIG. 1, the MPU 18 acquires various values for calculating a write resistance value $R_{total}$ that is detected by the write resistance detector 16, an internal temperature $T_{de}$ of the magnetic disk apparatus 1 that is detected by the temperature sensor 17, and a temperature $T_w$ of the write element 211 that is stored in the ROM 20. As shown by the broken line in FIG. 1, the MPU 18 may be configured to send the above control signals directly to the HDIC 14 without passing through the signal processing circuit 13.

Figure 8:
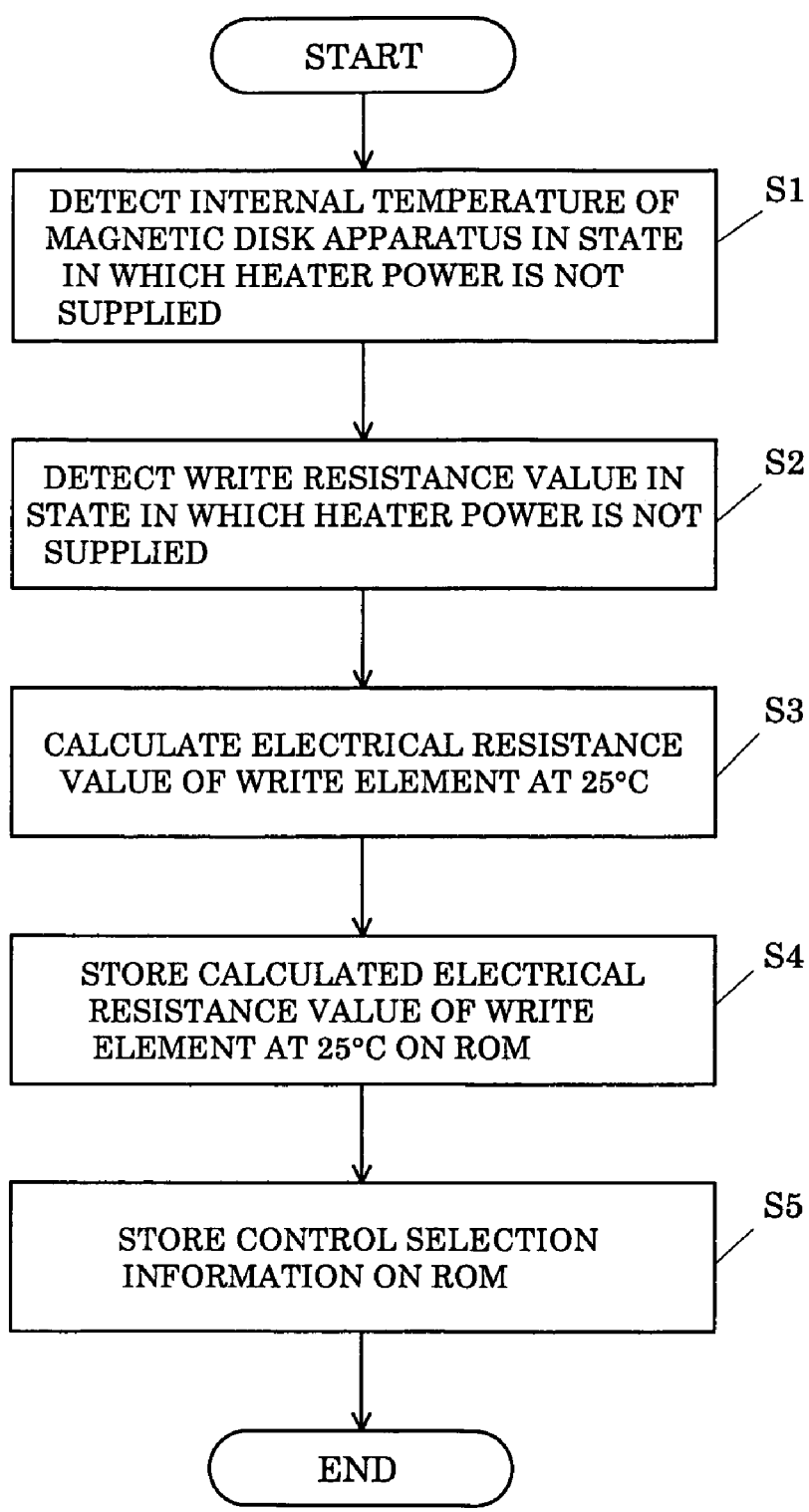
FIG. 8 is a diagram showing an example of a process flowchart to set a resistance value of a write element at 25° C. and control selection information before shipment of the magnetic disk apparatus.

Prior to shipment of the magnetic disk apparatus 1, the MPU 18 previously calculates a resistance value $R_{w25}$ of the write element 211 at 25° C., and stores the calculated value $R_{w25}$ in the ROM 20. For example, this calculation processing may be executed by a resistance value measurement unit (not shown) included in the MPU 18. For example, the value $R_{w25}$ is calculated using an expression (4), described later, based on the internal temperature $T_{de}$ that is detected by the temperature sensor 17 and the write resistance value $R_{total}$ that is detected by the write resistance detector 16. The reason for this is described together with expression (4). As illustrated in FIG. 8, only this calculation processing is performed prior to shipment, and not at the time of operation of the magnetic disk apparatus 1. This will be described later with reference to FIG. 8.

The write resistance detector 16 is a resistance detection unit that includes, for example, a known resistance detection circuit, which detects a write resistance value $R_{total}$ as the resistance value (used with the same meaning as electrical resistance value in this specification) of the write element 211. The write resistance detector 16 is connected to the write element 211 through the HDIC 14 and the magnetic head circuit 202. At the HDIC 14, output of the write element 211 is also input to the write resistance detector 16. The write resistance value $R_{total}$ that is detected by the write resistance detector 16 is, for example, $R_{total}$ in an equation (1) described later.

In this connection, the write resistance detector 16 may be provided in the HDIC 14. The write resistance detector 16 may also be realized by a program that is executed on the MPU 18.

The temperature sensor 17 detects the internal temperature $T_{de}$ of the magnetic disk apparatus 1. The internal temperature $T_{de}$ is the ambient temperature of the magnetic head 15, that is, the ambient temperature inside the casing of the magnetic disk apparatus 1. The temperature sensor 17 is provided inside the casing of the magnetic disk apparatus 1, for example in the vicinity of the magnetic head 15. The internal temperature detected by the temperature sensor 17 is, for example, $T_{de}$ in the equation (1) described later.

The ROM 20 comprises, for example, a flash memory (FROM), and stores various values for calculating a temperature $T_w$ of the write element 211. More specifically, the values $R_{w25}$, $\alpha_{w25}$, $R_{s25}$ and $\alpha_{s25}$ are stored. The value $R_{w25}$ is the resistance value of the write element 211 when the temperature thereof is 25° C. The value $\alpha_{w25}$ is the temperature coefficient of the write element 211 based on a temperature of 25° C. for the write element 211. The value $R_{s25}$ is the resistance value of the magnetic head circuit 202 when the temperature thereof is 25° C. The value $\alpha_{s25}$ is the temperature coefficient of the magnetic head circuit 202 based on a temperature of 25° C. for the magnetic head circuit 202.

The ROM 20 also stores control selection information. The control selection information is information indicating which control (control method) to perform among the group comprised of heater power control, sense current control and write current control, and is preset corresponding to the characteristics of the magnetic disk apparatus 1.

In this connection, a configuration may also be adopted whereby any one control method among these three control methods, namely, heater power control, sense current control and write current control, is selected and set in the ROM 20 as the control selection information. Alternatively, a configuration may be adopted whereby any two control methods among the above described three control methods are selected and set in the ROM 20.

Figure 2:
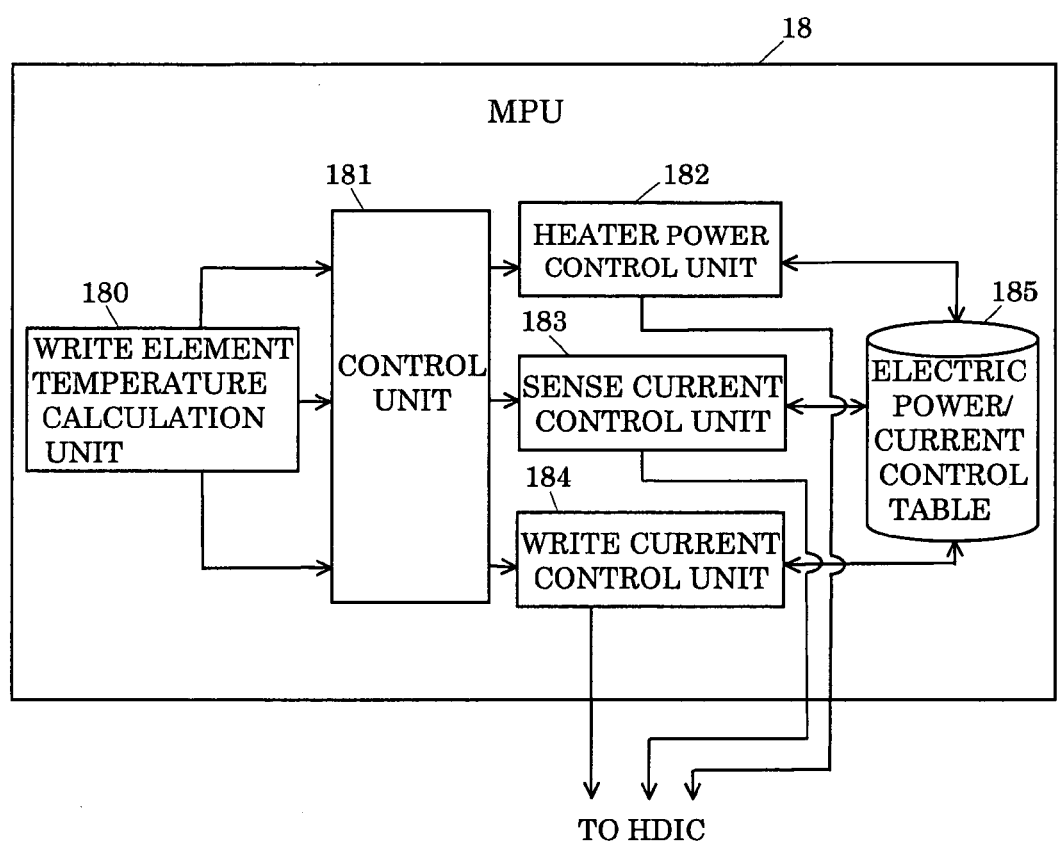
FIG. 2 is a diagram showing an example of a structure of a MPU.

FIG. 2 is a diagram showing an example of a structure of the MPU. The MPU 18 includes a write element temperature calculation unit (hereunder, referred to as "temperature calculation unit") 180, a control unit 181, a heater power control unit 182, a sense current control unit 183, a write current control unit 184 and an electric power/current control table (hereunder, referred to as "control table") 185. In practice, these control unit (excluding the control table 185) are realized by executing various processing programs that are stored in the ROM 20 on the MPU 18.

The temperature calculation unit 180 calculates a temperature $T_w$ of the write element 211 as the temperature of the magnetic head element 15. More specifically, the temperature calculation unit 180 reads out the resistance value $R_{w25}$ of the write element 211, the temperature coefficient $\alpha_{w25}$ of the write element 211, the resistance value $R_{s25}$ of the magnetic head circuit 202, and the temperature coefficient $\alpha_{s25}$ of the magnetic head circuit 202 from the ROM 20. The temperature calculation unit 180 then uses an equation (2), described later, to calculate the temperature $T_w$ of the write element 211 based on the write resistance value $R_{total}$ detected by the write resistance detector (resistance detection unit) 16, the internal temperature $T_{de}$ detected by the temperature sensor 17 and the values $R_{w25}$, $\alpha_{w25}$, $R_{s25}$, and $\alpha_{s25}$ that are read out from the ROM 20.

The control unit 181 reads the control selection information from the ROM 20, and based thereon, it recognizes which control to perform among the group comprised of heater power control, sense current control and write current control. The control unit 181 then causes any of the heater power control unit 182, the sense current control unit 183 or the write current control unit 184 to carry out the recognized control. Thus, processing for heater power control, sense current control or write current control can be selectively executed according to the control selection information that was stored in the ROM 20.

The heater power control unit 182 controls the heater power based on the temperature $T_w$ of the write element 211. More specifically, when the temperature $T_w$ of the write element 211 is equal to or greater than a predetermined temperature, the heater power control unit 182 performs control to suppress the heater power supply. For example, a plurality of predetermined temperatures can be set. This heater power control makes it possible to control temperature increases in the magnetic head element 15 (the write element 211 and the read element 210).

More specifically, the heater power control unit 182 refers to the control table 185 shown in FIG. 3, and carries out heater power control based thereon. The relation between the temperature $T_w$ of the write element 211 and a desirable heater power can be previously determined empirically. As a result, the control table 185 can be previously created for the heater power. As shown in FIG. 3, the control table 185 also stores control details for sense current control and write current control in addition to the heater power control. In practice, the control table 185 is stored in the ROM 20 and is referred to by (a predetermined processing unit) of the MPU 18.

For example, when the temperature $T_w$ of the write element 211 is below 100° C., the heater power control unit 182 does not change the heater power supplied (to be supplied; the same applies hereunder) to the heater 212 from the heater power at that time. In contrast, for example, when the temperature $T_w$ of the write element 211 is equal to greater than 100° C. and below 120° C., the heater power control unit 182 lowers the heater power by 5 mW from the heater power at that time. In other cases also, the heater power control unit 182 performs heater power control based on the control table 185. Thus, the heater power control unit 182 lowers the heater power when the temperature $T_w$ of the write element 211 is equal to or greater than a predetermined value. More specifically, the heater power control unit 182 lowers the heater power in stages in a predetermined range in response to the temperature $T_w$ of the write element 211. A configuration may also be adopted whereby the range for reducing the heater power is increased as the temperature $T_w$ of the write element 211 reaches a higher temperature.

The sense current control unit 183 controls the sense current based on the calculated temperature $T_w$ of the write element 211. More specifically, the sense current control unit 183 conducts control to set the sense current in response to the temperature $T_w$ of the write element 211. This sense current control makes it possible to avoid continuously passing a large sense current for a long period in a high temperature environment, thereby preventing read element migration and the like. When the sense current supply is suppressed in this manner, although there is some influence on reading of read data from the magnetic disk 22, there is virtually no problem in the actual read processing.

More specifically, the sense current control unit 183 refers to the control table 185 to carry out sense current control based thereon. The relation between the temperature $T_w$ of the write element 211 and a desirable sense current can be previously determined empirically. As a result, the control table 185 can be previously created with respect to the sense current. For example, when the temperature $T_w$ of the write element 211 is below 100° C., the sense current control unit 183 sets the sense current at 3.6 mA. The sense current control unit 183 also carries out sense current control in other cases based on the control table 185. In this manner, the sense current control unit 183 sets the sense current to be supplied to the read element 210 in response to the temperature $T_w$ of the write element 211. More specifically, the sense current control unit 183 lowers the sense current as the temperature $T_w$ of the write element 211 increases.

The write current control unit 184 controls the write current based on the calculated temperature $T_w$ of the write element 211. More specifically, the write current control unit 184 conducts control to set the write current in response to the temperature $T_w$ of the write element 211. This write current control makes it possible to avoid continuously performing write operations with a large write current in a high temperature state, to thereby prevent a failure such as a disconnection in a write coil. When the write current supply is suppressed in this manner, although there is some influence on writing of write data to the magnetic disk 22, there is virtually no problem in the actual write processing.

More specifically, the write current control unit 184 refers to the control table 185, and performs write current control based thereon. The relation between the temperature $T_w$ of the write element 211 and a desirable write current can be previously determined empirically. As a result, the control table 185 can be previously created with respect to the write current. For example, when the temperature $T_w$ of the write element 211 is below 100° C., the write current control unit 184 sets the write current at 35 mA. The write current control unit 184 also carries out sense current control in other cases based on the control table 185. In this manner, the write current control unit 184 sets the write current to be supplied to the write element 211 in response to the temperature $T_w$ of the write element 211. More specifically, the write current control unit 184 lowers the write current as the temperature $T_w$ of the write element 211 increases.

Next, processing for calculating the temperature $T_w$ of the write element 211 of the present invention that is executed by the temperature calculation unit 180 will be described in detail referring to FIGS. 4 to 7.

Figure 4:
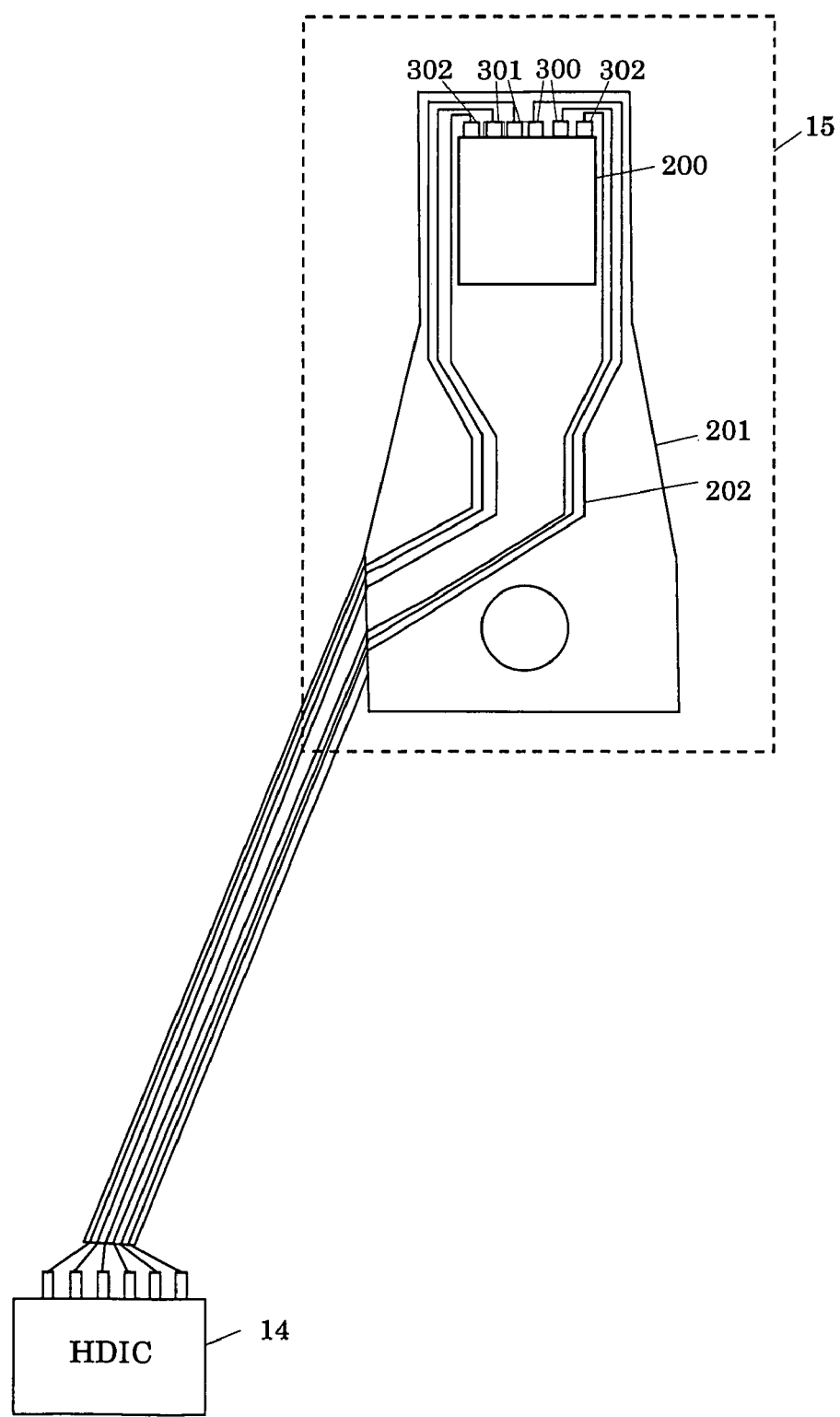
FIG. 4 is a diagram showing a magnetic head and a HDIC of the magnetic disk apparatus.

First, the structure of the magnetic head element 15 will be briefly described with reference to FIGS. 4 to 6. As shown in FIG. 4, the magnetic head element 15 includes a suspension 201. A slider 200 and a magnetic head circuit 202 are provided on the suspension 201. The slider 200 is the principal part of the magnetic head element 15, and includes the read element 210, the write element 211 and the heater 212. The magnetic head circuit 202 is a wiring (a wiring pattern) that is formed on the suspension 201, and it connects the slider 200 and the HDIC 14. Thus, since the magnetic head circuit 202 is long, the resistance value $R_s$ thereof cannot be ignored. Accordingly, the write resistance value $R_{total}$ that is detected at the write resistance detector 16 is actually a value obtained by adding the resistance value $R_w$ between the write terminals 300 to the resistance value $R_s$ of the magnetic head circuit 202, as illustrated in the equation (1) below.

Figure 5A:
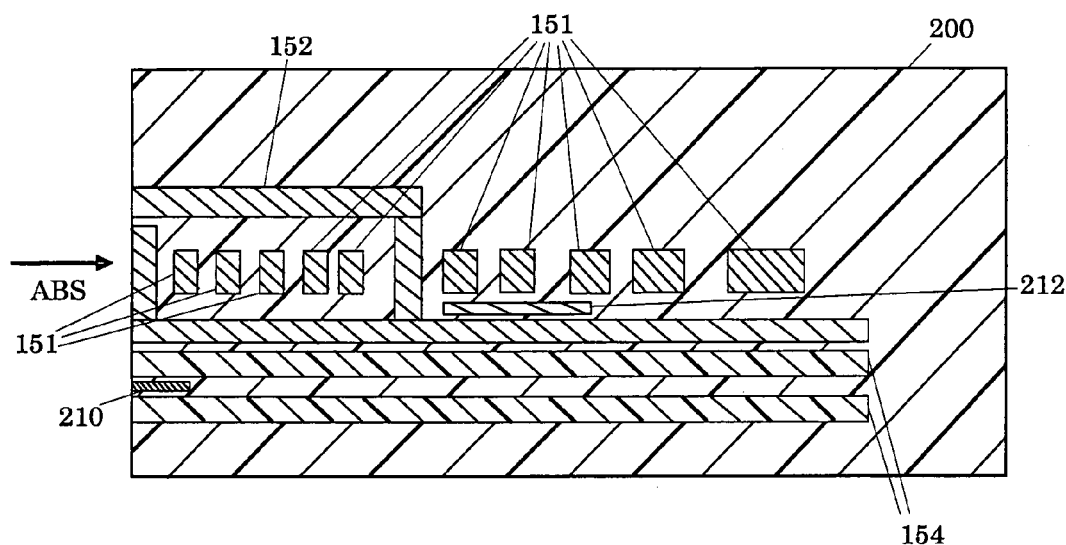
FIGS. 5A and 5B are diagrams showing an example in which a certain cross-section of the magnetic head is viewed from the side and an example in which a top of the magnetic head is viewed from above.
Figure 5B:
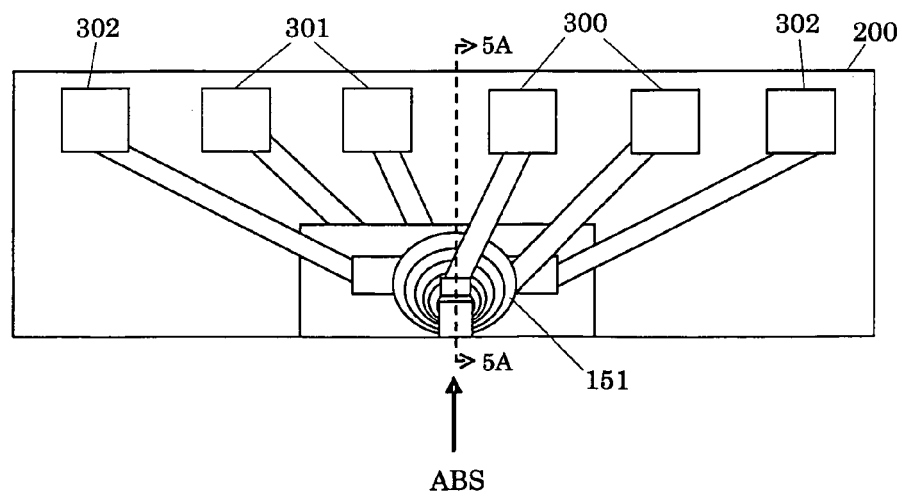

FIG. 5B is a partial enlarged view of the top part of the slider 200 shown in FIG. 4 (the direction of diagrammatic representation is different). In FIG. 5B, the surface indicated by the arrow is the ABS (air bearing surface) that is the surface of the magnetic head element 15 having the slider 200 that faces the magnetic disk 22 (the same applies in FIG. 5A and FIG. 6). As shown in FIG. 5B (and FIG. 4), the slider 200 includes the write terminal 300, a read terminal 301 and a heater terminal 302. The write terminal 300 is a connection terminal of a write coil comprised by the write element 211, the read terminal 301 is a connection terminal of the read element 210, and the heater terminal 302 is a connection terminal of the heater 212.

FIG. 5A is a partial cross section of the top part of the slider 200 along the cutting line 5A-5A shown in FIG. 5B (the direction of diagrammatic representation is different). As shown in FIG. 5A, the slider 200 includes a write coil 151, a magnetic pole 152, the heater 212, a shield 154 and the read element 210. The write coil 151 and the magnetic pole 152 comprise the write element 211. As described in the foregoing, the magnetic head element 15 includes the slider 200 and the suspension 201. The heater 212 is disposed in the vicinity of the write coil 151. The shield 154 blocks the influence of a magnetic field generated by the magnetic pole 152 from reaching the read element 210.

Figure 6A:
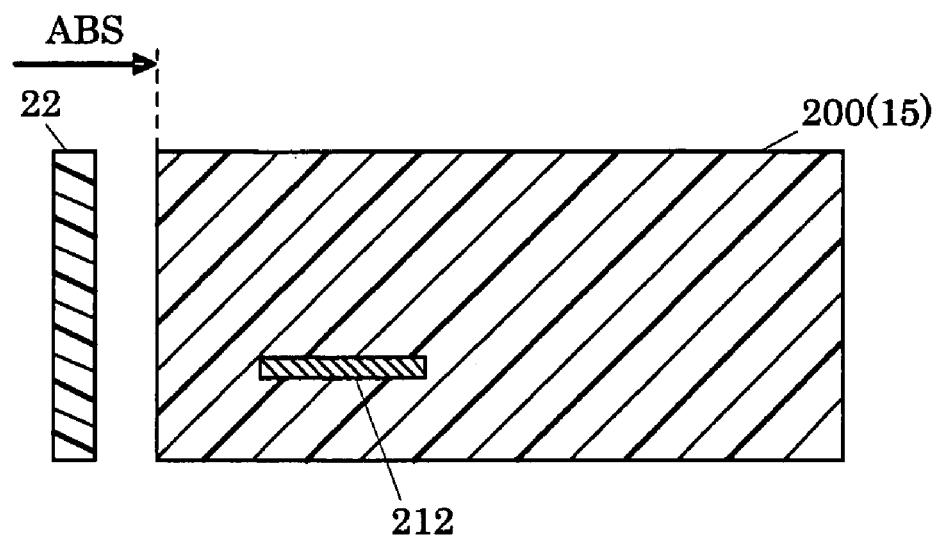
FIGS. 6A and 6B are diagrams showing a cross-section of the magnetic head element for describing protrusion control for the magnetic head element.
Figure 6B:
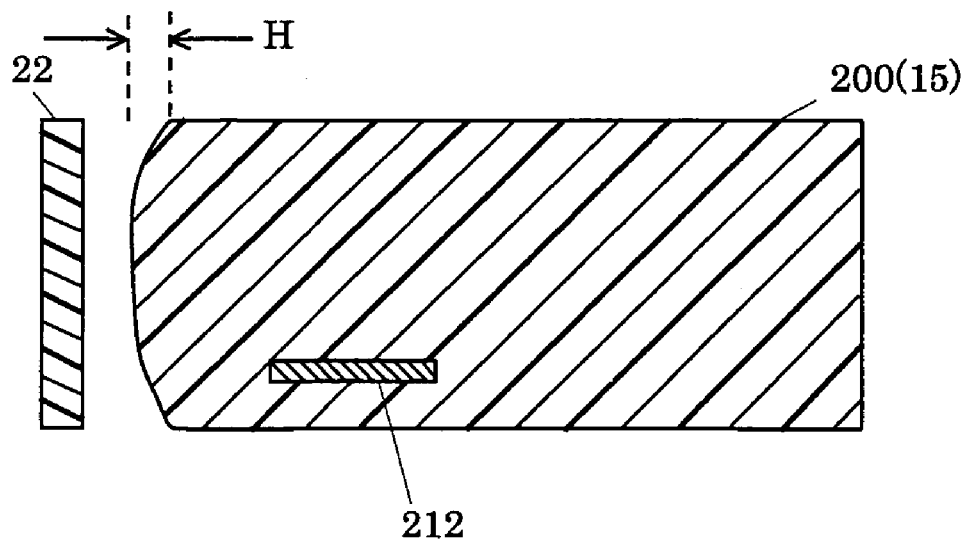

FIG. 6A is a diagram showing a state in which the magnetic head element 15 having the slider 200 as shown in FIG. 5A faces the magnetic disk 22. As shown in FIG. 6A, before supplying heater power to the heater 212 of the magnetic head element 15, the ABS of the magnetic head element 15 faces the magnetic disk 22 in a parallel manner. When heater power is supplied to the heater 212, the magnetic head element 15 mainly expands in a predetermined direction according to heat generation by the heater 212. As a result, as shown in FIG. 6B, the magnetic head element 15 protrudes in the direction of the magnetic disk 22. Consequently, the position of the ABS shown in FIG. 6A moves (protrudes), as shown in FIG. 6B, in the direction of the magnetic disk 22 by the distance H. Thus, although heating of the heater 212 is essential for control of the magnetic spacing, it is necessary to suppress the influence of the heating on the write element 211 and the read element 210.

As described above, when the internal temperature detected by the temperature sensor 17 is $T_{de}$, the write resistance value $R_{total}$ detected by the write resistance detector 16 is shown as follows.

$$R_{total} = R_w + R_s = \{\alpha_{w25} \times R_{w25} \times (T_w-25) + R_{w25}\} + \{\alpha_{s25} \times R_{s25} \times (T_{de}-25) + R_{s25}\} \quad \text{equation (1)}$$

The write resistance value $R_{total}$ is the resistance value of the write element 211 as viewed from the HDIC 14. The resistance value $R_w$ is the resistance value between the write terminals 300. The resistance value $R_s$ represents resistance components other than the resistance value $R_w$ in the write resistance value $R_{total}$.

According to the equation (1), the temperature $T_w$ of the write element 211 is shown as follows.

$$T_w = \{R_{total} - R_{w25} - R_{s25} - \alpha_{s25} \times R_{s25} \times (T_{de}-25)\}/(\alpha_{w25} \times R_{w25}) + 25 \quad \text{equation (2)}$$

Here, the temperature coefficient $\alpha_{s25}$ of the magnetic head circuit 202 and the resistance value $R_{s25}$ of the magnetic head circuit 202 can be known previously and, for example, a design value can be used as it is. Alternatively, a measurement value that was obtained for an individual magnetic disk apparatus 1 can be used for a plurality of other magnetic disk apparatuses 1. This is because the magnetic head circuit 202 has sufficiently thick wiring, and thus there is little variation in the resistance values thereof.

Figure 7:
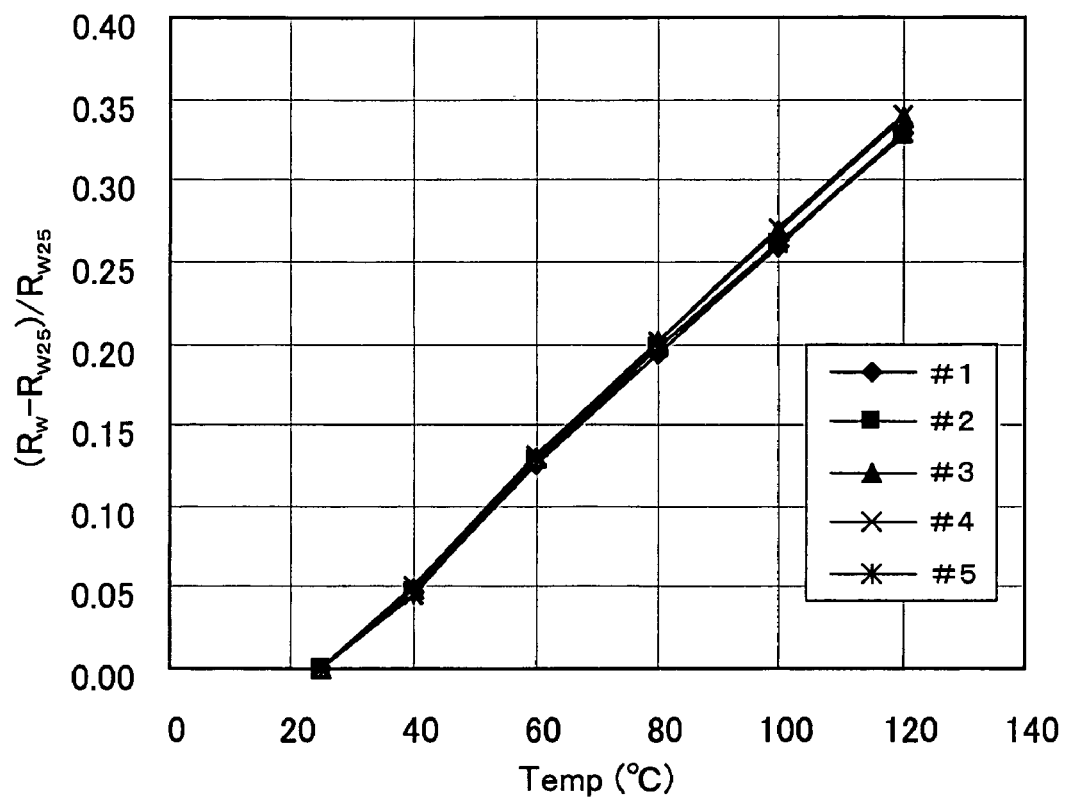
FIG. 7 is a diagram showing the dependence of a write element resistance value on temperature.

With respect to $\alpha_{w25}$ also, since there is little variation among respective write elements 211, a value can be previously set based on experimental results as shown in FIG. 7. Accordingly, a measurement value that was obtained for an individual magnetic disk apparatus 1 can be used for a plurality of other magnetic disk apparatuses 1. FIG. 7 shows the results of an experiment to determine changes in resistance values in response to changes in temperature for each of five write elements 211 denoted as samples #1 to #5. In this case, the write coil 151 of the slider 200 shown in FIG. 5A includes, for example, copper (Cu). The dependence on temperature of the resistance value $R_w$ of the write element 211 is as shown in the graph of FIG. 7.

In FIG. 7, the vertical axis represents the resistance value $((R_w - R_{w25})/R_{w25})$ between the write terminals 300 that was normalized with the resistance value $R_{w25}$, and the horizontal axis represents temperature. As shown in FIG. 7, the resistance value $R_w$ of the write element 211 changes roughly in proportion to the temperature, and there are almost no individual differences among the respective write elements 211. Accordingly, the write element 211 has characteristics that are suited for use as a temperature sensor. Thus, the temperature coefficient $\alpha_{w25}$ of the write element 211 is determined based on the graph shown in FIG. 7.

In contrast, the resistance value $R_{w25}$ varies depending on the particular write element 211 in question due to various reasons. This is a separate problem to the fact that variations in the value $\alpha_{w25}$ are small. More specifically, this means that even though there are small variations with respect to the slope of the graph in FIG. 7, there are differences in individual values. For this reason, it is necessary to determine the value $R_{w25}$ individually in advance. The value $R_{w25}$ is determined as described below.

In a state in which heater power is not supplied to the heater 212, when the internal temperature of the magnetic disk apparatus 1 is $T_{de}$ the write resistance value $R_{total}$ detected by the write resistance detector 16 is shown as follows.

$$R_{total} = R_w + R_s = \{\alpha_{w25} \times R_{w25} \times (T_{de}-25) + R_{w25}\} + \{\alpha_{s25} \times R_{s25} \times (T_{de}-25) + R_{s25}\} \quad \text{equation (3)}$$

Accordingly, the resistance value $R_{w25}$ of the write element 211 at 25° C. is shown as follows.

$$R_{w25} = [R_{total} - \{\alpha_{s25} \times R_{s25} \times (T_{de}-25) + R_{s25}\}]/\{\alpha_{s25} \times (T_{de}-25)+1\} \quad \text{equation (4)}$$

As will be understood from the foregoing, the magnetic disk apparatus 1 previously (for example, prior to shipping) determines the resistance value $R_{w25}$ of the write element 211 at 25° C. using equation (4) (see FIG. 8). Then, at the time of operation, the magnetic disk apparatus 1 calculates the temperature $T_w$ of the write element 211 using equation (2) (see FIG. 9). At this time, the write resistance value $R_{total}$ and the internal temperature $T_{de}$ that are detected in real time, and the resistance value $R_{w25}$ of the write element 211, the temperature coefficient $\alpha_{w25}$ of the write element 211, the resistance value $R_{s25}$ of the magnetic head circuit 202 and the temperature coefficient $\alpha_{s25}$ of the magnetic head circuit 202 that are read from the ROM 20 are used.

FIG. 8 is a process flowchart for presetting a temperature control process. FIG. 8 shows one example of a process flowchart for presetting the resistance value $R_{w25}$ of the write element 211 and the control selection information.

As described above, since manufacturing variations occur with respect to the resistance value $R_{w25}$ of the write element 211 among individual write elements 211 (namely, the magnetic head element 15), it is necessary to determine the resistance value $R_{w25}$ individually for each write element 211. Therefore, the value of $R_{w25}$ is calculated using the above described equation (4), and the thus calculated $R_{w25}$ value is stored in the ROM 20 prior to shipment of the magnetic disk apparatus 1. Accordingly, the processing shown in FIG. 8 is conducted for each individual magnetic disk apparatus 1 prior to shipment.

The magnetic disk apparatus 1 is placed in an atmosphere with a temperature of 25° C. (ambient temperature). In this connection, the ambient temperature may be a different temperature than this. In this state, the magnetic disk apparatus 1 is connected to a testing apparatus (host computer) to conduct various kinds of tests. In these tests, the resistance value $R_{w25}$ of the write element 211 is calculated.

In FIG. 8, the temperature sensor 17 detects the internal temperature $T_{de}$ of the magnetic disk apparatus 1 in a state in which heater power is not supplied to the heater 212 (step S1). Further, the write resistance detector 16 detects the write resistance value $R_{total}$ of the write element 211 in a state in which heater power is not supplied to the heater 212 (step S2). More specifically, $R_{total}$ as shown in the equation (3) is detected.

Next, based on the internal temperature $T_{de}$ that was detected in the step S1 and the write resistance value $R_{total}$ that was detected in the step S2, the MPU 18 calculates the resistance value $R_{w25}$ of the write element 211 using the equation (4) (step S3), and stores this value $R_{w25}$ at a predetermined position on the ROM 20 (step S4). The MPU 18 also stores control selection information at a predetermined position on the ROM 20 according to a user input specifying which control to execute (step S5).

In this connection, separately to the processing shown in FIG. 8 (or in the step S5), the MPU 18 stores the temperature coefficient $\alpha_{w25}$ of the write element 211, the resistance value $R_{s25}$ of the magnetic head circuit 202 and the temperature coefficient $\alpha_{s25}$ of the magnetic head circuit 202 at predetermined positions on the ROM 20, respectively. Similarly, the MPU 18 stores the control table 185 at a predetermined position on the ROM 20.

Figure 9:
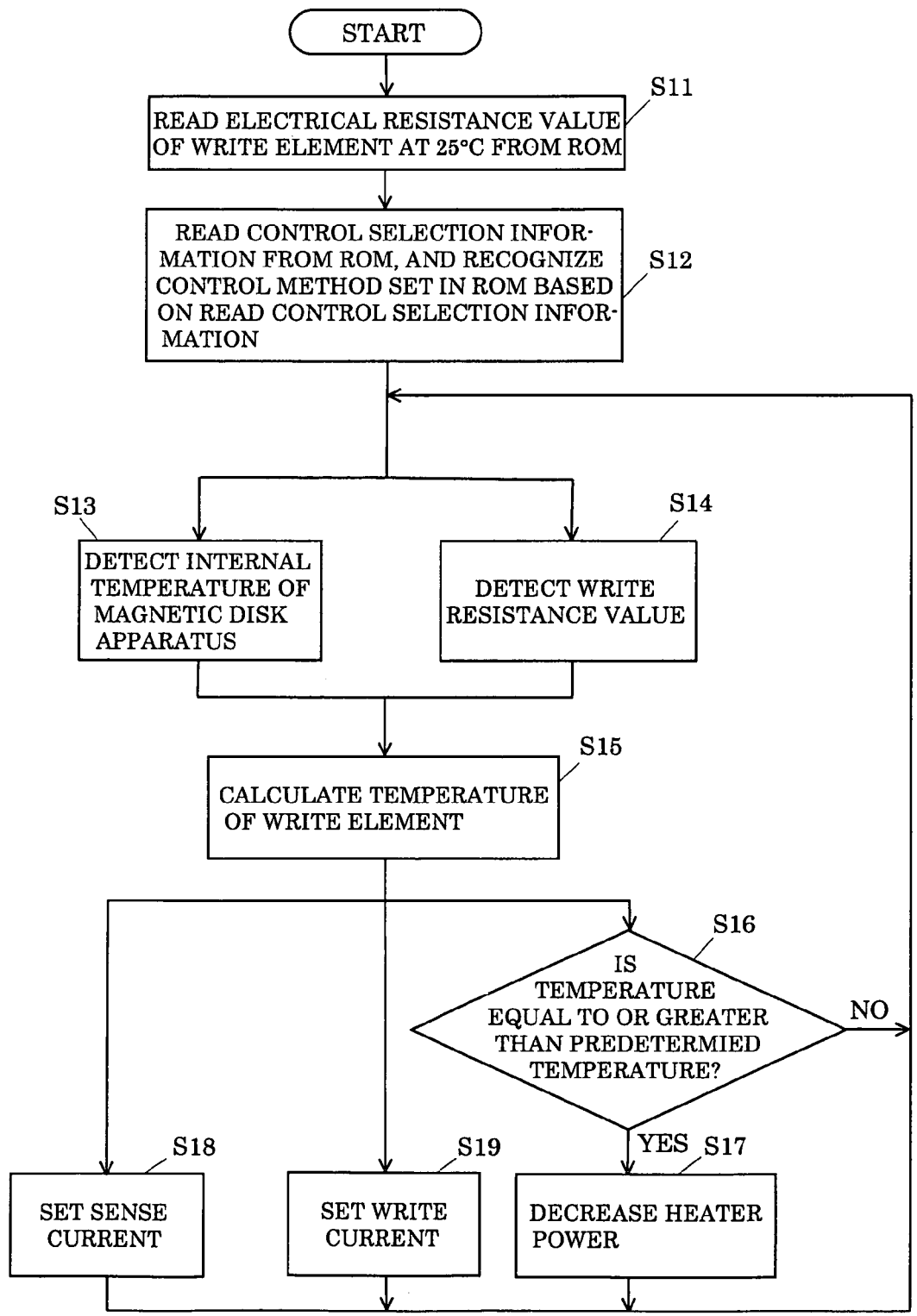
FIG. 9 is a diagram showing an example of a process flowchart to control a heater power, a sense current and a write current.

FIG. 9 is a process flowchart for a temperature control process. FIG. 9 shows an example of a process flowchart for controlling heater power, sense current and write current. This processing is executed upon operation after shipment of the magnetic disk apparatus 1.

At the start of operation of the magnetic disk apparatus 1 (for example, when the power is turned on), the temperature calculation unit 180 of the MPU 18 reads the resistance value $R_{w25}$ of the write element 211 from the ROM 20 (step S11). The control unit 181 also reads the control selection information from the ROM 20 and recognizes the control method that was set in the ROM 20 based on the read control selection information (step S12). More specifically, based on the read control selection information, the control unit 181 recognizes which control is set among the group comprised of heater power control, sense current control and write current control, and executes the set control after performing step S15.

When the magnetic disk apparatus 1 starts operation, the temperature sensor 17 detects the internal temperature $T_{de}$ of the magnetic disk apparatus 1 (step S13) and the write resistance detector 16 detects the write resistance value $R_{total}$ in the equation (1) (step S14). In practice, steps S13 and S14 are carried out in parallel.

Meanwhile, when the magnetic disk apparatus 1 starts operation, the temperature calculation unit 180 calculates the temperature $T_w$ of the write element 211 (step S15). More specifically, based on the resistance value $R_{w25}$ of the write element 211 that was detected in the step S11, the internal temperature $T_{de}$ that was detected in the step S13, the write resistance value $R_{total}$ that was detected in the step S14, the temperature coefficient $\alpha_{w25}$ of the write element 211, the resistance value $R_{s25}$ of the magnetic head circuit 202, and the temperature coefficient $\alpha_{s25}$ of the magnetic head circuit 202, the temperature calculation unit 180 calculates the temperature $T_w$ of the write element 211 using the above described equation (2). The value of $\alpha_{w25}$, $R_{s25}$, and $\alpha_{s25}$ are, for example, read from the ROM 20 in the step S11 or S15.

Thereafter, when the control method that was recognized in the step S12 is heater power control, the heater power control unit 182 refers to the control table 185 to check whether or not the calculated temperature $T_w$ of the write element 211 is equal to or greater than a predetermined temperature (step S16). When the calculated temperature $T_w$ is equal to or greater than the predetermined temperature, the heater power control unit 182 decreases the heater power by a predetermined value (step S17) and the processing of the step S13 and onward is repeated. In the step S16, when the calculated temperature $T_w$ of the write element 211 is not equal to or greater than a predetermined temperature, the processing of the step S13 and onward is repeated.

When the control method that was recognized in the step S12 is sense current control, the sense current control unit 183 refers to the control table 185 to set the sense current to a predetermined value (step S18), and the processing of the step S13 and onward is then repeated.

When the control method that was recognized in the step S12 is write current control, the write current control unit 184 refers to the control table 185 to set the write current to a predetermined value (step S19), and the processing of the step S13 and onward is then repeated.

As described in the foregoing, according to the magnetic disk apparatus of the present invention, in a magnetic head element having a heater for controlling a protruding amount thereof, temperature increases in the magnetic head element can be suppressed by controlling the heater power supplied to the heater based on a calculated temperature of a write element. Furthermore, by controlling a sense current supplied to a read element or a write current supplied to the write element based thereon, it is possible to prevent migration or the like in the read element, prevent the generation of noise due to instability of the read element, and prevent migration, a disconnection or the like in a write coil of the write element. As a result, the magnetic head element can be used in a temperature range that does not compromise the reliability of the magnetic head element, and thus the reliability of the magnetic head element can be enhanced and the magnetic head element can be used for a longer time.

What is claimed is:

1. A magnetic disk apparatus, comprising:
    a magnetic head element including a read element and a write element;
    a heater provided in the magnetic head element and controlling a protruding amount of the magnetic head element;
    a resistance detection unit detecting a resistance value of the write element;
    a write element temperature calculation unit calculating a temperature of the write element as a temperature of the magnetic head element based on the resistance value of the write element detected by the resistance detection unit and a temperature coefficient of the write; and a sense current control unit controlling a sense current supplied to the read element based on the temperature of the write element calculated by the write element temperature calculation unit.

2. The magnetic disk apparatus according to claim 1, wherein the sense current control unit sets a sense current supplied to the read element in response to the temperature of the write element calculated by the write element temperature calculation unit.

3. The magnetic disk apparatus according to claim 1, wherein the write element temperature calculation unit further calculates the temperature of the write element using a preset resistance value of the write element at an ordinary temperature.

4. The magnetic disk apparatus according to claim 1, further comprising:

a temperature sensor detecting an internal temperature of the magnetic disk apparatus, wherein the write element temperature calculation unit further calculates the temperature of the write element using the internal temperature detected by the temperature sensor, a preset resistance value of a magnetic head circuit at an ordinary temperature, and a preset temperature coefficient of the magnetic head circuit.

5. A magnetic disk apparatus, comprising:

a magnetic head element including a read element and a write element;

a heater provided in the magnetic head element and controlling a protruding amount of the magnetic head element;

a resistance detection unit detecting a resistance value of the write element;

a write element temperature calculation unit calculating a temperature of the write element as a temperature of the magnetic head element based on the resistance value of the write element detected by the resistance detection unit and a temperature coefficient of the write element; and a write current control unit controlling a write current supplied to the write element based on the temperature of the write element calculated by the write element temperature calculation unit.

6. The magnetic disk apparatus according to claim 5, wherein the write current control unit sets a write current supplied to the write element in response to the temperature of the write element calculated by the write element temperature calculation unit.

7. A magnetic disk apparatus comprising:

a magnetic head element including a read element and a write element;

a heater provided in the magnetic head element and controlling a protruding amount of the magnetic head element;

a resistance detection unit detecting a resistance value of the write element;

a write element temperature calculation unit calculating a temperature of the write element as a temperature of the magnetic head element based on the resistance value of the write element detected by the resistance detection unit and a temperature coefficient of the write element; and a control unit performing control of the sense current or control of the write current based on the temperature of the write element calculated by the write element temperature calculation unit and a preset control selection information that indicates which control to be performed, control of a sense current to be supplied to the read element or control of a write current to be supplied to the write element.

* * * * *